Aug. 12, 1952   D. FIRTH   2,606,453
MACHINERY DRIVE
Filed April 26, 1950   2 SHEETS—SHEET 1
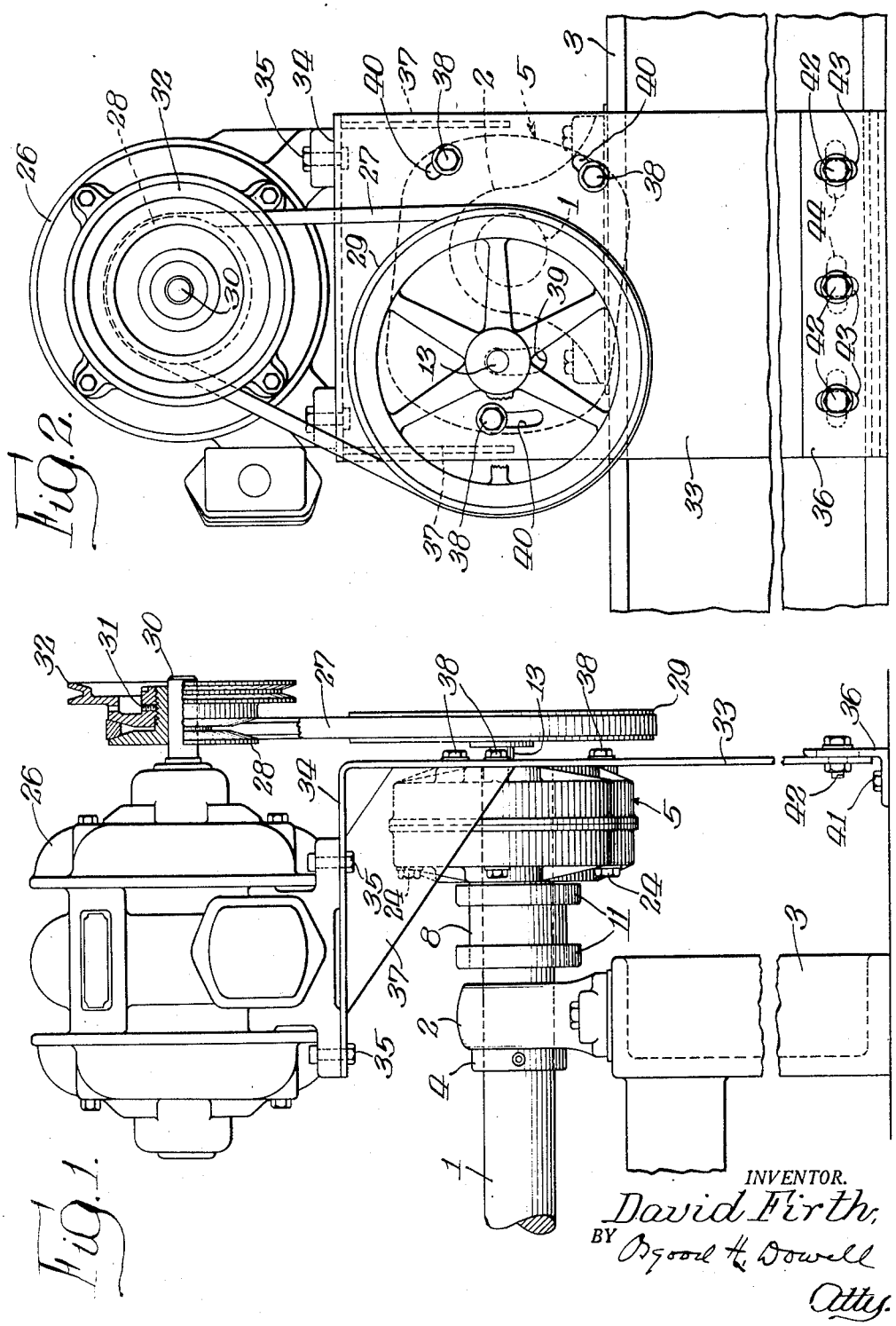
INVENTOR.
David Firth,
BY
Atty.

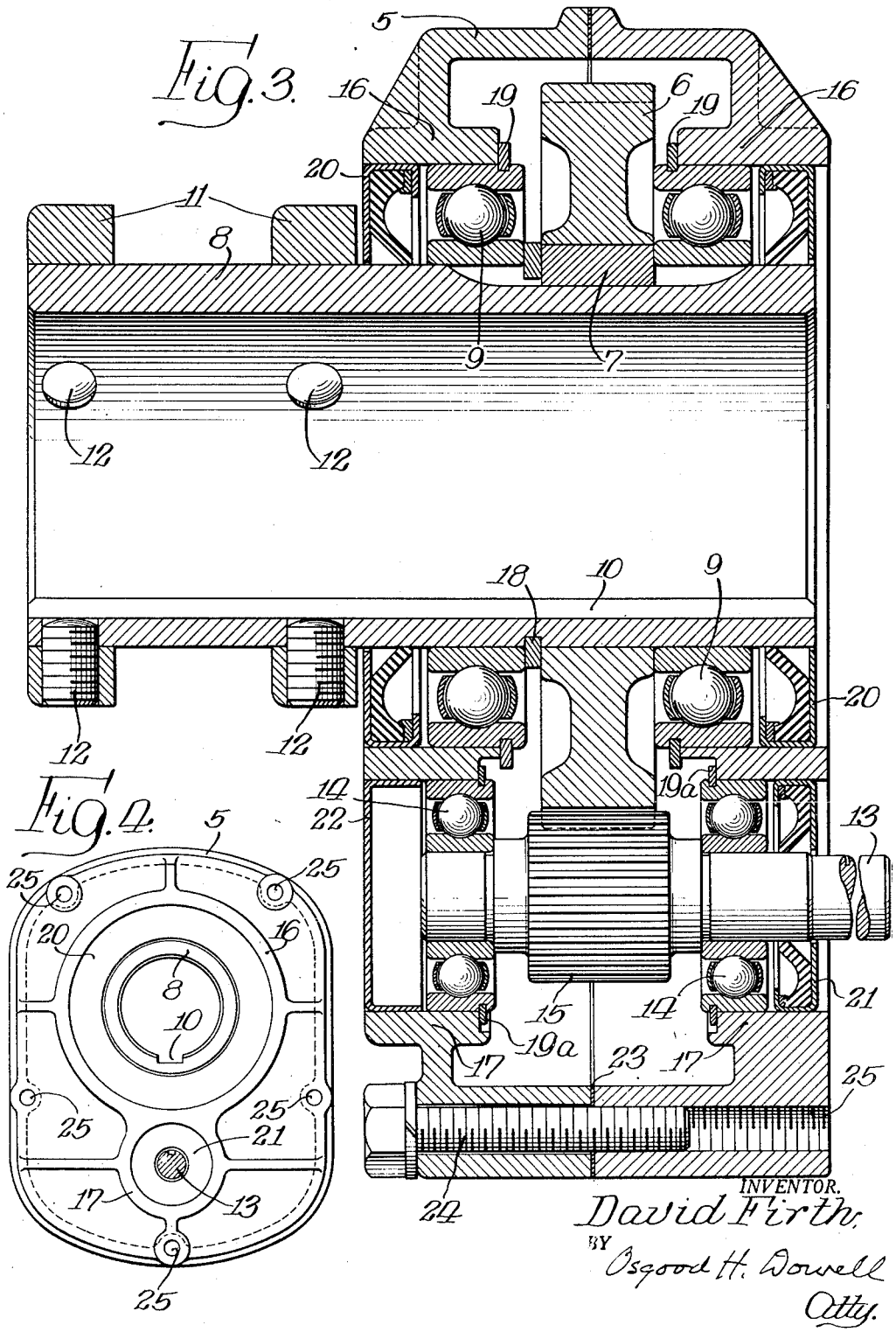

Patented Aug. 12, 1952

2,606,453

UNITED STATES PATENT OFFICE 2,606,453

MACHINERY DRIVE

David Firth, South Bend, Ind., assignor to Dodge Manufacturing Corporation, Mishawaka, Ind., a corporation of Indiana Application April 26, 1950, Serial No. 158,151

8 Claims. (Cl. 74—421)

This invention pertains to machinery drives of the type in which power from a motor is transmitted to the shaft to be driven through a speed-reducing unit mounted on such shaft and belt-driven from the motor.

In a drive of the type referred to, the gear case of the speed-reducing unit is rotatably mounted on the shaft to be driven. The gear case must therefore be held against rotation. For this purpose, it is common to employ a so-called torque-arm consisting of a rigid link pivotally connected to the gear case and to a fixed anchorage.

The work of installing such drives is often very considerable. In some installations, relatively expensive motor-supporting structures must be provided.

Although a torque-arm of the kind above described will hold the gear case of the speed-reducing unit against rotative movement, yet in many installations a jerking of the driving belt by the motor, in starting the driving operation against a heavy inertia load, will be communicated through the gear case of the speed-reducing unit to the shaft to be driven, with the effect of lifting the shaft in its bearings within the limits allowed by clearance in the shaft bearings. Even such a slight momentary dislocation or misalignment of the shaft to be driven may be objectionable in some cases, e. g. if the shaft to be driven be the card cylinder shaft of a carding machine such as is used in spinning mills.

A feature of the present invention is a motor-supporting standard to which the gear case of the speed-reducing unit is rigidly fastened, said standard serving the dual purpose of a torque-arm and support for the motor. By mounting the motor on and rigidly fastening the gear case to a common member, the advantage is obtained that jerking of the driving belt by the motor in starting the driving operation will not cause a lifting or displacement in its bearings of the shaft to be driven.

Another advantage is that the weight of the speed-reducing unit may be sustained partially or even largely by the motor-supporting standard, thus reducing the overhanging load on the stub extension of the shaft to be driven, this being an important consideration in some cases including drives for carding machines.

Aside from the particular advantages above noted, the invention provides, in or for a machinery drive of the class indicated, a simple and relatively inexpensive structure for supporting the motor and holding the gear case of the speed-reducing unit in proper position, allowing easy and quick installation of the drive, at minimum labor and expense.

Another feature of the invention is the provision, in or for a drive of the class aforesaid, of improved means for holding the gear case of the speed-reducing unit against rotative movement, such means allowing adjustment of the gear case to different angular positions on the shaft to be driven and securing it fast in adjusted position, thereby permitting shifting of the center of the power input shaft of the speed-reducing unit as required for belt tightening or to permit easy installation of the driving belt and tightening thereof after it is installed.

Further features of the invention ancillary or subsidiary to those above mentioned will be understood from the following description.

A machinery drive embodying the invention in one practicable form is shown for illustration in the accompanying drawings.

Fig. 1 is a side elevation of the illustrative drive.

Fig. 2 is a front elevation thereof, some of the spokes of the belt-sheave on the power-input shaft of the speed-reducing unit being omitted or broken away for better illustration of certain features behind said sheave.

Fig. 3 is a sectional view of the speed-reducing unit employed in the illustrative drive.

Fig. 4 is a front view of the gear case of said unit.

In Figs. 1 and 2, the numeral 1 designates a shaft to be driven. This may be the drive shaft of a machine or machine unit. It may be the shaft on which is mounted the card cylinder of a textile carding machine. Said shaft is mounted in fixed bearings, one of which is shown as a pillow block bearing 2 mounted on a supporting pedestal 3. The shaft is held from axial displacement in either direction by collars fixed on the shaft and adapted to bear rotatably against the inner faces of the bearing housings. One such collar 4 is shown in association with the bearing 2.

Removably mounted on a stub extension of the shaft 1 is a speed-reducing unit the gear case of which is designated by the numeral 5. This unit, comprising gearing for transmitting power to the shaft from a belt drive, may be of various specific types and constructions. The unit selected for illustration in the illustrative drive is shown in Figs. 3 and 4. Though the specific unit shown gives only one speed reduction, it will be understood that a unit giving a plurality of speed reductions may be employed, e. g. a unit for two speed reductions as suggested in Fig. 2 of the expired patent to Brown, No. 1,806,328 of May 19, 1931.

As shown in Fig. 3, the driven gear 6 of the illustrative speed-reducing unit is mounted on and secured by a driving key 7 to a torque-transmitting sleeve 8 which in effect is an extended hub of said gear. This sleeve, mounted in bearings 9 in the gear case, and held in assembly with the case as hereinafter indicated, is adapted to be slipped on the shaft 1 and secured thereto in driving connection therewith by a key (not shown) engaging in mating keyways in said shaft and sleeve. The keyway in the sleeve 8 is shown at 10. Said sleeve extends rearwardly through and beyond the back wall of the gear case, and its extension is provided with means for securing it rigidly to the shaft. The means provided in this instance comprises a pair of collars 11 fitted on the sleeve extension and carrying radially disposed set screws 12 engaging in threaded holes in the collars and passing loosely through unthreaded holes in the sleeve extension. Preferably each collar has a pair of such set screws arranged an angular distance apart of about 120 degrees from center to center. By tightening said set screws against the shaft, the sleeve extension is rigidly clamped between the shaft and collars. As shown in Fig. 3, the collars are arranged so that one set screw in each collar bears against the shaft key.

The power input shaft of the speed-reducing unit is designated in the drawings by the numeral 13. This shaft, mounted in bearings 14 in the gear case, has integral therewith a pinion 15 in mesh with the gear 6, the latter being of relatively large diameter for speed reduction. The reduction obtainable by the described unit will of course depend upon the ratio of diameters of the gears 15 and 6.

Referring again to Figs. 3 and 4, certain details of construction of the illustrative speed-reducing unit are explained as follows: The bearings for the sleeve 8 and the power input shaft 15 are ball bearings comprising concentric outer and inner race-rings and interposed balls. The opposite walls of the gear case are formed with alined open-ended tubular formations 16 in which the sleeve bearings 9 are mounted, and with other such formations 17 in which the bearings 14 for the power input shaft are mounted. The gear case is held in assembly with the sleeve 8, and against axial displacement relative thereto, by coaction of the bearing race-rings with thrust shoulders. As shown, the inner race-ring of the left hand sleeve bearing 9 abuts the gear 6, which abuts a snap ring 18 spacing said gear 6 from the inner race-ring of the right hand sleeve bearing 9. The outer race-rings of the sleeve bearings 9 are equipped with snap rings 19 engaging in grooves in said race-rings and affording shoulders abutting the inner ends of the tubular formations 16. To hold the power-input shaft from axial displacement, the outer race-rings of the bearings 14 are equipped with snap rings 19a abutting the inner ends of the tubular formations 17, while the inner race-rings of said bearings bear against thrust shoulders on said power-input shaft. The gear case is sealed around the sleeve 8 by sealing closures 20. The front opening through which the power-input shaft 13 extends is sealed by a sealing closure 21, and the opposite opening is closed by the sealing closure 22. The gearing may therefore work in oil.

As shown, the gear case is split transversely of the sleeve 8, its opposite members or half-parts being fastened together with an interposed gasket 23 clamped therebetween. The bolt fastenings connecting the case members are shown as cap screws 24 inserted through the back member and engaging in threaded holes 25 in the front member. The front end surfaces of the tubular formations 16 and 17 of said front member, and the surfaces of the parts of said front member containing the screw holes 25, are in the same vertical plane, as shown in Fig. 3, there being no projections from said member beyond said plane. Thus the gear case has in effect a flat front face, as is desirable for reasons presently to appear.

In the illustrative drive shown in Figs. 1 and 2, the speed-reducing unit is installed as hereinbefore described, the sleeve 8 being keyed to the shaft 1 and rigidly secured thereto by the clamping collars 11. The gear case 5 may be considered as rotatably mounted on the shaft 1, in that it is so mounted on the sleeve 8 fixed to said shaft. The gearing in the case drivingly connects the power input shaft 13 to the shaft 1, since the driven gear 6 is fixed on the shaft 1 through the sleeve 8, driving key 7 and the driving key (not shown) connecting said sleeve and shaft 1.

The power-input shaft 13, which extends through and beyond the front wall of the gear case 5, is driven from a stationarily mounted electric motor 26 through a belt drive which in the form shown comprises a V-belt 27 engaging driving and driver sheaves 28 and 29 on the motor shaft 30 and power-input shaft 13. A drive between the shafts 30 and 13 of either of the multiple V-belt type or of the chain and sprocket type may be substituted as an equivalent of the single V-belt drive shown.

The speed at which the power-input shaft 13 is driven depends of course upon ratio of pitch diameters of the driving and driven sheaves 28 and 29. The driving sheave 28 is shown as adjustable for varying its pitch diameter for fine speed adjusting purposes. Adjustment thereof is accomplished by loosening the screw 31 and revolving one half member of the sheave on the threaded hub of the other. The pulley 32 unitary with the driving sheave 28 is provided as an accessory for any additional drive that may be required to be taken off from the motor.

The motor 26 is supported above the shaft 1 by a standard 33 fixed to the floor of the factory in which the machinery is installed, or to any suitable fixed foundation. Said standard is arranged immediately in front of the gear case 5 and formed with a rearwardly extending shelf 34 on which the motor rests, the motor frame being fastened thereto by bolts 35. The gear case 5 is rigidly fastened to the standard, which thus serves the double purpose of a torque-arm and support for the motor. In the drawings, intermediate portions of the bearing pedestal 3 and motor-supporting standard 33 are broken away for compactness of illustration. The height of the standard or distance from the floor to the shelf 34 may be several feet, say, three or four feet or more, depending upon the elevation at which the shaft 1 is mounted.

A form of standard desirable for simplicity, compactness and other reasons is provided by a vertical metal plate of sufficient width and thickness for rigidity, affixed to and supported from a base bar 36 fastened to the floor, said plate having the shelf 34 bent therefrom and braced by bracing plates 37. These bracing plates may be integrated with the shelf and vertical portion of the standard by welding.

The standard 33 is positioned against the front flat face of the gear case 5 and fastened rigidly thereto by bolt fastenings provided in this instance by cap screws 38 inserted through openings in the standard and screwed into the front member of the gear case, the standard 33 being thereby clamped between the gear case and heads of said cap screws. The threaded screw holes 25 for the screws 24 connecting the half-parts of the gear case may be utilized as the screw holes for the cap screws 38.

The plane of the belt drive from the motor to the power input shaft 13 is in front of the standard 33, which has an opening through which said shaft extends. Said opening is shown as an arcuate slot 39, and the openings in the standard through which the shanks of the cap screws 38 extend are shown as arcuate slots 40. The several arcuate slots referred to are struck on radii from the center of the shaft 1 and appropriately arranged to allow a limited rotative movement of the gear case 5 about the shaft 1 when the cap screws 38 are loosened. Thus the bear case can be fastened to the standard 33 in different angular relations to the shaft 1.

As the power input shaft 13 is parallel with the shaft 1, rotative movement of the gear case 5 about 1 will shift the center of 13, thus varying the distance between centers of the belt sheaves 28 and 29. The gear case is shown arranged with the power input shaft 13 to one side of shaft 1, so that the distance between centers of the belt sheaves 28 and 29 will be substantially changed by a slight angular movement of the gear case. Looking at Fig. 2, it is apparent that upon loosening the cap screws 36, the gear case can be turned about 1 from the position shown in a counter-clockwise direction, for tensioning the driving belt 27, whereupon the screws 38 can be tightened to secure the gear case in adjusted position.

The plane of the belt drive from the motor to the power input shaft 13 is sufficiently spaced from the standard 33 to provide between said standard and the belt sheave 29 a suitable clearance to permit manipulation of the cap screws 38 by an appropriate wrench.

The arrangement of the gear case 5 relative to the shaft 1 in a position such as indicated in Fig. 2, is not only the most favorable arrangement for belt tightening, but is also desirable for compactness and to permit utilizing a short driving belt, and gives still another important advantage in that with this arrangement a substantial part of the weight of the speed-reducing unit is taken by the standard 33. Furthermore, by virtue of means presently to be described, the standard 33 after being secured to the gear case can be so adjusted vertically relative to its supporting base bar 36 as to sustain a major part of the weight of said gear case and parts carried thereby, thus reducing to a minimum the overhanging load on the stub extension of the shaft 1.

Inasmuch as the gear case 5 is rigidly fastened to the standard on which the motor is mounted, it is apparent that a sudden jerking of the driving belt 27 by the motor in starting will not cause any lifting or displacement of the gear case and hence will not cause any displacement in its bearings of the driven shaft 1.

The base bar 36 to which the standard 33 is fastened is shown as an angle bar resting on and fastened to the floor by lag bolts 41 and having its vertical flange rigidly fastened to the standard by bolts 42 and thereby supporting the standard from the floor, the lower end of the standard being rigidly clamped between said vertical flange and the nuts on said bolts 42. The shanks of the bolts 42 pass through vertical slots 43 in the base bar and horizontal slots 44 in the lower end of the standard, to permit necessary adjustment of the base bar relative to the standard.

To install the illustrative drive, it is only necessary to mount the speed-reducing unit on the shaft 1 to be driven, assemble the standard 33 with the gear case 5 in the relationship shown and secure them in such relationship by inserting and tightening the cap screws 38, then secure the base bar 36 to the standard in proper adjusted relation and fasten the base bar to the floor, then mount the motor on the standard and install a belt drive from the motor to the power input shaft 13. The work involved is simple and can be expeditiously performed, and the structure provided to support the motor and to hold the gear case in position is of simple and relatively inexpensive character.

Obviously the illustrative drive may be variously modified in details to suit different requirements and conditions.

As before stated, a chain and sprocket drive from the motor to the power input shaft is to be considered an equivalent of a belt drive. Such terms as belt, belt-driven, sheave, etc., are to be construed accordingly in the appended claims.

I claim:

1. A drive of the class described comprising a mounted shaft to be driven, driving means therefor comprising a motor and a speed-reducing unit having a power input shaft belt-driven from the motor, said unit comprising gearing connecting said shafts and a gear case rotatably mounted on said shaft to be driven and having said power input shaft journalled therein and supported thereby, said power input shaft being parallel with and spaced laterally from said shaft to be driven, and a rigid standard supported in fixed position on which said motor is mounted, said gear case being rigidly fastened to said standard, whereby jerking of the power input shaft by the motor in starting under a heavy inertia load is prevented from causing momentary dislocation or misalignment of said shaft to be driven by lifting or displacement thereof in its bearings.

2. A drive of the class described comprising a mounted shaft to be driven, driving means therefor comprising a motor and a speed-reducing unit having a power input shaft belt-driven from the motor, said unit comprising gearing connecting said shafts and a gear case rotatably mounted on said shaft to be driven and having said power input shaft journalled therein and supported thereby, and a standard supported in fixed position on which said motor is mounted and to which said gear case is rigidly fastened, said standard comprising a vertical plate arranged in front of and abutting said gear case and having an arcuate slot through which said power input shaft extends, fastening bolts connecting said plate to said case, said plate having arcuate slots through which said bolts extend, permitting adjustment of said gear case to different angular positions and securing it fast to said plate in adjusted position.

3. A drive of the class described comprising a mounted shaft to be driven, driving means therefor comprising a motor and a speed-reducing unit having a power input shaft belt-driven from the motor, said unit comprising gearing connecting said shafts and a gear case rotatably mounted on said shaft to be driven and having said power input shaft journalled therein and supported thereby, and a motor-supporting standard to which said gear case is rigidly fastened, said standard comprising a vertical plate supported in fixed position in front of and abutting said gear case and having a rearwardly extending rigid shelf on which said motor is mounted over the shaft to be driven, said plate having an arcuate slot through which said power input shaft extends, fastening bolts connecting said case to said plate, there being arcuate slots in said plate through which said bolts extend, permitting adjustment of the gear case to different angular positions and securing it fast to said plate in adjusted position.

4. A drive of the class described comprising a mounted shaft to be driven, driving means therefor comprising a motor and a speed-reducing unit having a power input shaft belt-driven from the motor, said unit comprising gearing connecting said shafts and a gear case rotatably mounted on said shaft to be driven and having said power input shaft journalled therein and supported thereby, and a motor-supporting standard to which said gear case is rigidly fastened, said standard comprising a fixed base and a vertical plate rigidly fastened thereto and rising therefrom in front of said gear case and having a rearwardly extending rigid shelf on which said motor is mounted over the shaft to be driven, said plate being fastened to said base in a manner permitting adjustment of said plate vertically relative to said base.

5. A drive of the class described comprising a mounted shaft to be driven, driving means therefor comprising a motor and a speed-reducing unit having a power input shaft belt-driven from the motor, said unit comprising gearing connecting said shafts and a gear case rotatably mounted on said shaft to be driven and having said power input shaft journalled therein and supported thereby, and a motor-supporting standard to which said gear case is rigidly fastened, said standard comprising a fixed base and a vertical plate rigidly fastened thereto and rising therefrom in front of said gear case and having a rearwardly extending rigid shelf on which said motor is mounted, said gear case being fastened to said plate in a manner permitting adjustment of said case to different angular positions relative to the shaft to be driven and securing it fast to said plate in adjusted position, and said plate being fastened to said base in a manner permitting adjustment of said plate vertically and horizontally relative to said base.

6. A drive of the class described comprising a mounted shaft to be driven, a motor supported in fixed position, a speed-reducing unit mounted on said shaft and having a power input shaft belt-driven from said motor, said unit comprising gearing connecting said shafts and a gear case rotatably mounted on said shaft to be driven and having said power input shaft journalled therein and supported thereby, and a standard supported in fixed position to which said gear case is rigidly fastened in a manner permitting adjustment of said gear case to different angular positions and securing it fast to said plate in adjusted position, said standard comprising a vertical plate arranged in front of and abutting said gear case, fastening bolts connecting said plate to said case, said plate having an arcuate slot through which said power intake shaft extends and arcuate slots through which said bolts extend.

7. For use in a drive of the class described, a speed-reducing unit comprising a power intake shaft and a tubular power output element and gearing connecting them and a gear case rotatably mounted on said element and carrying said power input shaft, said tubular element adapted to be slipped on and secured to a mounted shaft to be driven and said power input shaft extending through the front wall of said case and adapted to be belt-driven from a motor, and a standard adapted to be fastened to and supported from a stationary foundation and to support the motor, said standard comprising a vertical plate arranged in front of and abutting said gear case and bolted thereto, said plate having an arcuate slot through which said power input shaft extends and arcuate slots through which said bolts extend, whereby the gear case can be rigidly fastened to said standard in different angular positions of said case relative to the shaft to be driven.

8. For use in a drive of the class described, a standard comprising a flat plate having a shelf on which to mount a motor and adapted for fastening thereto under said shelf a gear case mounted on a shaft to be driven, and a base adapted to be fastened to a floor and to hold said plate in erect position, said base having a vertical flange to which said plate is rigidly fastened in a manner to allow vertical adjustment of said plate, said plate having arcuate slots through which to pass bolts for fastening said case to said plate and having an arcuate slot through which to pass a power-input shaft carried by said case, whereby said case can be rigidly fastened to said standard in different angular positions of said case relative to the shaft to be driven.

DAVID FIRTH.

REFERENCES CITED

The following references are of record in the file of this patent:

UNITED STATES PATENTS

| Number | Name | Date |
|---|---|---|
| 644,954 | Wales | Mar. 6, 1900 |
| 1,879,508 | Robertson | Sept. 27, 1932 |
| 2,116,166 | Christian | May 3, 1938 |
| 2,176,572 | Hedgpeth | Oct. 17, 1939 |
| 2,200,101 | Schmitter | May 7, 1940 |
| 2,334,357 | Sjogren | Nov. 16, 1943 |
| 2,402,859 | Webber | June 25, 1946 |
| 2,446,645 | Flinchbaugh | Aug. 10, 1948 |
| 2,471,120 | Pepin | May 24, 1949 |
| 2,475,042 | McCloskey | July 5, 1949 |

FOREIGN PATENTS

| Number | Country | Date |
|---|---|---|
| 8,594 | Great Britain | Apr. 13, 1908 |